United States Patent
Mitchell et al.

(10) Patent No.: US 10,986,951 B2
(45) Date of Patent: Apr. 27, 2021

(54) DELIVERY RETRIEVAL STATION

(71) Applicant: Haier US Appliance Solutions, Inc., Wilmington, DE (US)

(72) Inventors: Alan Joseph Mitchell, Louisville, KY (US); Vineeth Vijayan, Louisville, KY (US); Matthew Hunter, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/583,637

(22) Filed: Sep. 26, 2019

(65) Prior Publication Data

US 2021/0093116 A1 Apr. 1, 2021

(51) Int. Cl.
| | | |
|---|---|---|
| *A47G 29/14* | (2006.01) |
| *B65G 1/00* | (2006.01) |
| *G07F 17/12* | (2006.01) |
| *A47G 29/20* | (2006.01) |
| *B65G 1/04* | (2006.01) |
| *B65G 1/137* | (2006.01) |
| *B66F 9/07* | (2006.01) |

(52) U.S. Cl.
CPC .......... *A47G 29/141* (2013.01); *A47G 29/20* (2013.01); *B65G 1/0435* (2013.01); *B65G 1/0485* (2013.01); *B65G 1/1378* (2013.01); *B66F 9/07* (2013.01); *G07F 17/12* (2013.01); *A47G 2029/144* (2013.01); *A47G 2029/147* (2013.01)

(58) Field of Classification Search
CPC .................. A47G 29/141; A47G 29/20; A47G 2029/144; A47G 2029/147; B65G 1/0435; B65G 1/0485; B65G 1/1378; B66F 9/07; G07F 17/12
See application file for complete search history.

(56) References Cited

U.S. PATENT DOCUMENTS

| | | | |
|---|---|---|---|
| 10,124,912 B2* | 11/2018 | Walsh ........................ B64F 1/32 |
| 2012/0025679 A1* | 2/2012 | Roering ............. B64D 11/0007 312/236 |
| 2016/0140496 A1* | 5/2016 | Simms .................. B64C 39/024 705/337 |
| 2016/0159496 A1* | 6/2016 | O'Toole ............... G06Q 10/083 244/110 E |
| 2019/0043298 A1* | 2/2019 | Moudy .............. G07C 9/00857 |
| 2019/0057350 A1* | 2/2019 | Simms ................... H04N 7/183 |
| 2019/0282015 A1* | 9/2019 | High .................... A47G 29/141 |
| 2020/0250915 A1* | 8/2020 | Schachte ............ G06Q 10/0836 |

FOREIGN PATENT DOCUMENTS

| | | |
|---|---|---|
| AU | 8792301 A | 4/2002 |
| CN | 208588135 U | 3/2019 |
| EP | 3099989 A1 | 12/2016 |

\* cited by examiner

*Primary Examiner* — Thomas D Alunkal
(74) *Attorney, Agent, or Firm* — Dority & Manning, P.A.

(57) ABSTRACT

A delivery retrieval station, as provided herein, may include a delivery base and a destination container. The delivery base may include a receiving platform and a conditioning assembly in thermal communication with the receiving platform. The conditioning assembly may be disposed within a mechanical compartment beneath the receiving platform. The destination container may be selectively mounted to the base station. The destination container may include a base wall and sidewall defining a storage chamber. The base wall may be selectively supported on the receiving platform in a delivered position.

18 Claims, 4 Drawing Sheets

DELIVERY RETRIEVAL STATION

FIELD OF THE INVENTION

The present subject matter relates generally to a station for receiving a delivery package, such as at a consumer's home or residence.

BACKGROUND OF THE INVENTION

Purchasing goods or products remotely, such as from individual Internet retailers or aggregating delivery providers, is becoming increasingly popular with consumers. Convenience and economies of scale often motivate consumers to shop and pay for items without ever visiting a physical store. Items such as clothes, appliances, and perishable food items are all being purchased and delivered in greater numbers throughout much of the world. In some instances, those items can be delivered in a matter of days or even hours.

Although the increase in remote shopping provides numerous benefits to consumers, certain difficulties are also caused or exacerbated by the increase. For instance, retailers and delivers have been forced to address the unpredictability that is common with increased remote shopping. Often the size, frequency, and care instructions can vary wildly based on the item being delivered. This can lead to difficulties in how an item or items may be transported and ultimately delivered to the consumer. Certain items may be perishable and must be kept within a specific, often relatively low, temperature range. For example, numerous food items are prone to spoil if left outdoors or on the doorstep of the consumer's residence. Moreover, with the increased number of deliveries being made to consumers' residences, there may be a greater concern or opportunity for thefts to occur.

Attempts have been made to address some of the above issues by simply delivering to a remote nonresidential location, such as a locker. However, this can greatly decrease the convenience that is typically associated with remote shopping. Moreover, it is often difficult for a consumer, retailer, or delivery provider to know if multiple items will fit within a locker prior to delivery. This may cause frustration for consumers, and increased expenses for the retailer or delivery provider. Some have suggested granting retailers or delivery providers direct access to consumers' residences or buildings. The privacy and safety concerns for this are self-evident.

As a result, it would be useful to provide a station or system for delivering and retrieving a consumer delivery. In particular, it would be advantageous to provide a delivery retrieval station that addresses one or more of the above issues, such as safely maintaining delivered items at a refrigerated temperature before a consumer is able to retrieve the items.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a delivery retrieval station is provided. The delivery retrieval station may include a delivery base, a destination container, and a station lock. The delivery base may include a receiving platform and a conditioning assembly in thermal communication with the receiving platform. The conditioning assembly may be disposed within a mechanical compartment beneath the receiving platform. The destination container may be selectively mounted to the base station. The destination container may include a base wall and sidewall defining a storage chamber. The base wall may be selectively supported on the receiving platform in a delivered position. The station lock may be in mechanical communication between the base station and the destination container. The container lock may selectively join the delivery base to the destination container in the delivered position.

In another exemplary aspect of the present disclosure, a delivery retrieval station is provided. The delivery retrieval station may include a delivery base and a destination container. The delivery base may include a receiving platform and a conditioning assembly in thermal communication with the receiving platform. The conditioning assembly may be disposed within a mechanical compartment beneath the receiving platform. The destination container may be selectively mounted to the base station. The destination container may include a base wall and sidewall defining a storage chamber. The base wall may be selectively supported on the receiving platform in a delivered position. The receiving platform may define an air exchange passage extending from the mechanical compartment. The delivery base may further include an exchange door selectively movable between a closed position restricting air through the air exchange passage and an open position permitting air movement through the air exchange passage between the mechanical compartment and the storage chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
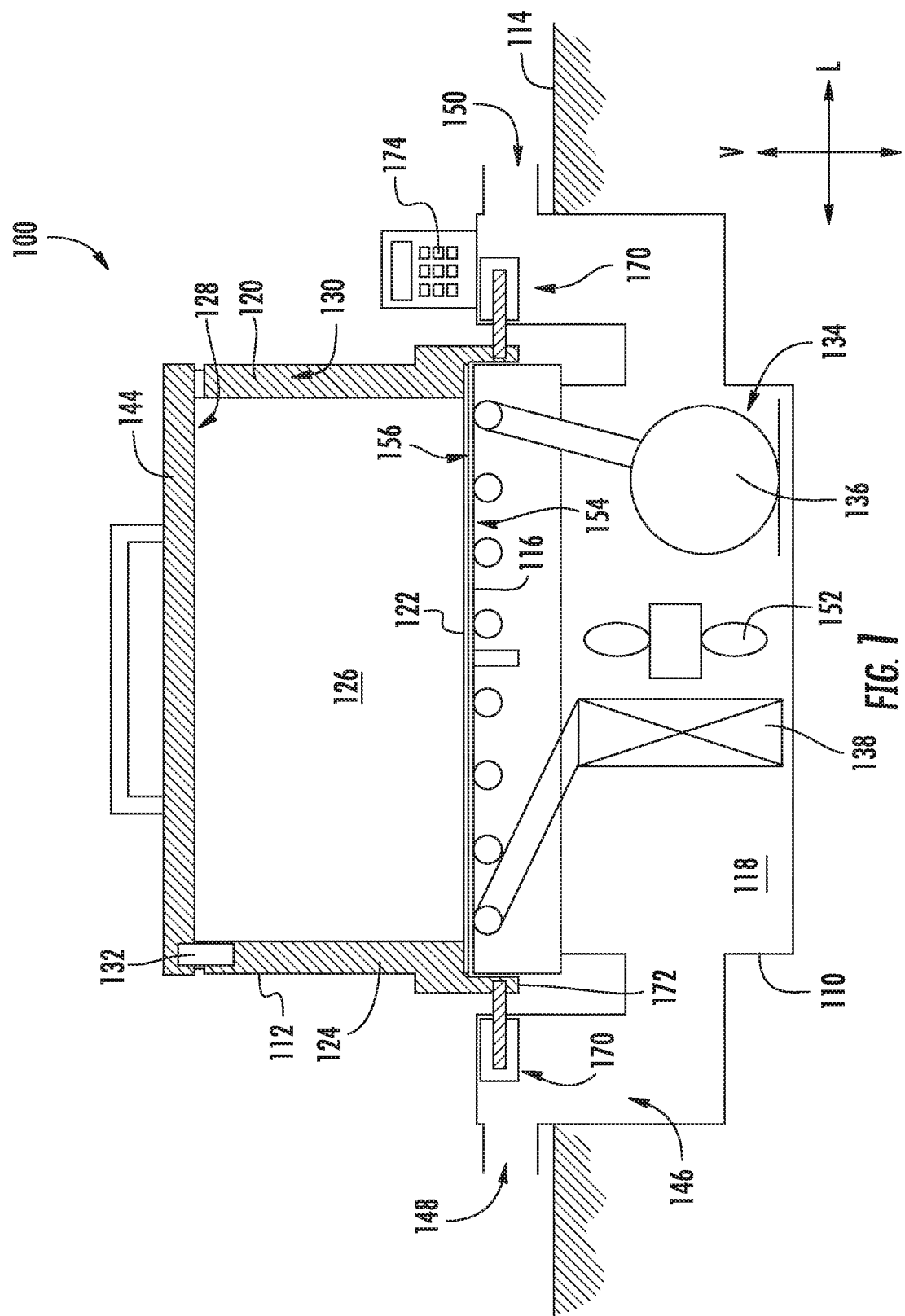
FIG. 1 provides a schematic, sectional view of a delivery retrieval station according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 2:
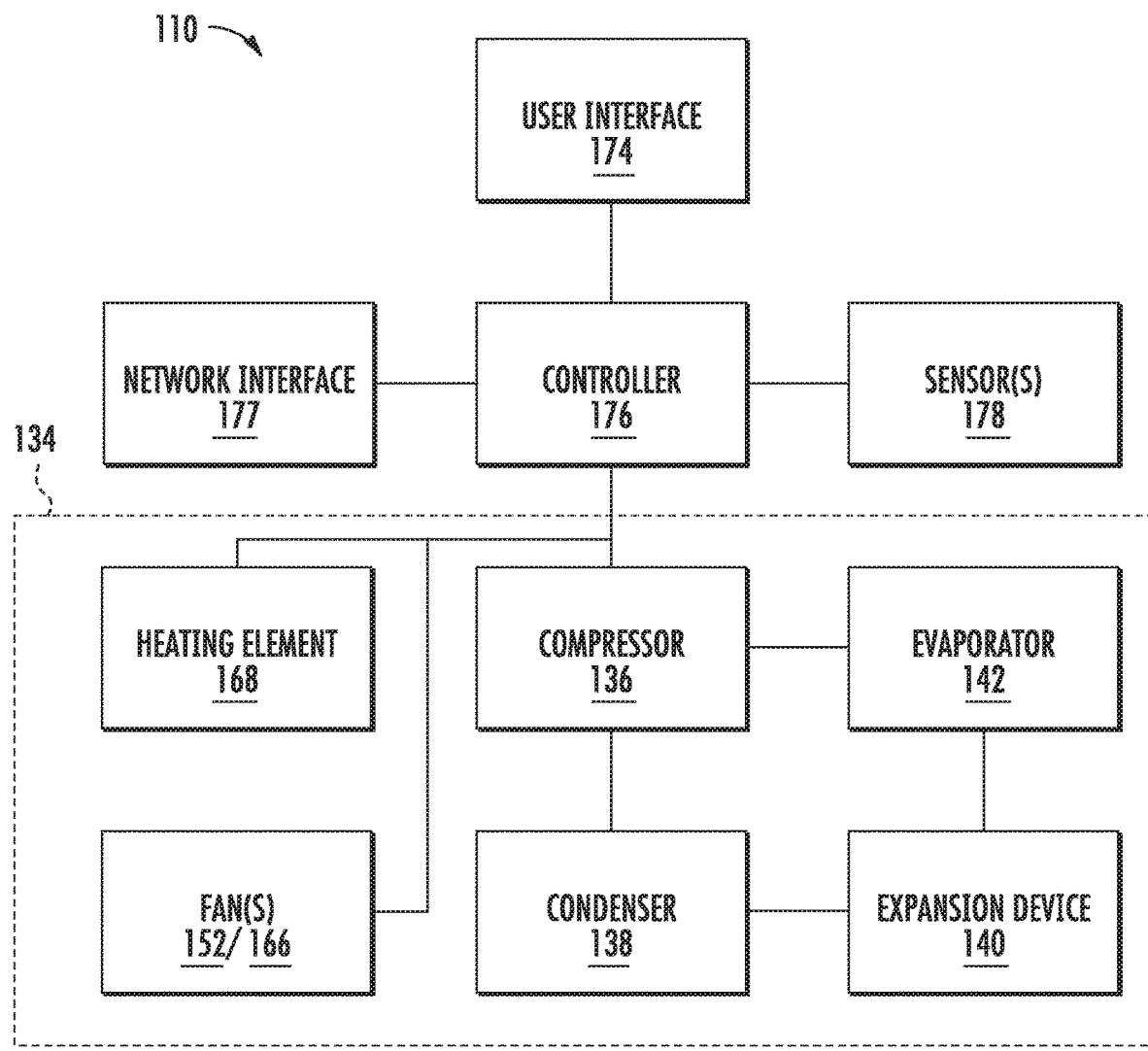
FIG. 2 provides a schematic view of a delivery base of a delivery retrieval station according to exemplary embodiments of the present disclosure.

Turning now to the figures, FIG. 1 provides a schematic, sectional view of an exemplary delivery retrieval station 100 that includes a delivery base 110 and a destination container 112 that can be selectively (e.g., removably) mounted to and removed from destination container 112. FIG. 2 provides a schematic view of delivery base 110.

Generally, delivery base 110 may be installed or fixedly mounted to the ground or floor 114 of a surrounding area. For instance, delivery base 110 may be fixedly mounted outside of a consumer's residence or building for selective access by a delivery agent. Delivery base 110 generally defines a mutually-orthogonal vertical direction V, lateral direction L, and transverse direction.

As shown, delivery base 110 includes a receiving platform 116 positioned above a mechanical compartment 118. In some embodiments, receiving platform 116 includes a plate that is parallel to the ground 114 or the lateral direction L. Optionally, receiving platform 116 may be level with (e.g., at the same height) as the surrounding ground 114. In some embodiments, mechanical compartment 118 extends into the ground 114 or a recessed region below receiving platform 116. Additionally or alternatively, one or more compartment walls may extend (e.g., vertically) below receiving platform 116 to support the same or (at least partially) define mechanical compartment 118 (e.g., one or more lateral or transverse extrema of mechanical compartment 118).

Separate from or in addition to being parallel to lateral direction L, receiving platform 116 may generally be shaped to receive and complement at least a portion of destination container 112, as will be described in greater detail below. Receiving platform 116 may be formed from or include any suitable material to support destination container 112. In some embodiments, receiving platform 116 includes a conductive plate, such as a plate formed from a thermally conductive material or metal, such as aluminum, stainless steel, copper, etc. (including alloys thereof).

Destination container 112 includes a cabinet 120 that is selectively removable from delivery base 110. In other words, destination container 112 may be moved to and from a mounted condition in which at least a portion of cabinet 120 is supported on delivery base 110. Along with being supported on delivery base 110, destination container 112 may be in thermal communication with receiving platform 116. As shown, cabinet 120 includes a base wall 122 and a sidewall 124 that together define a storage chamber 126 (e.g., as a partially enclosed volume) within which one or more packages or delivered product units may be stored, such as when a delivery agent has arrived at a consumer's residence while the consumer is absent or otherwise unavailable to receive a delivery directly. An opening 128 is further defined by cabinet 120 (e.g., by sidewall 124) in communication with storage chamber 126. Through opening 128, packages or delivered product units may be selectively inserted into or removed from storage chamber 126.

Cabinet 120 may be formed from or include any suitable non-permeable material. In some embodiments, sidewall 124 includes or encloses an insulation 130 (e.g., insulating material) within a non-permeable liner (e.g., inner and outer liner panels). As an example, the insulation 130 may be provided as a substantially evacuated vacuum within the liner. As an additional or alternative example, the insulation 130 may include a set mass of a predetermined gas, such as nitrogen, oxygen, argon, or a suitable inert gas. As another additional or alternative example, the insulation 130 may include with a solid insulating material, such as rigid polyurethane insulating foam. As yet another additional or alternative example, the insulation 130 may include a suitable phase change material, such as an organic or inorganic PCM having a melting temperature below 150° Celsius.

In some embodiments, base wall 122 includes or is formed as a conductive plate, such as a plate formed from a thermally conductive material or metal, such as aluminum, stainless steel, copper, etc. (including alloys thereof). Optionally, the material of the base wall 122 may be distinct or unique from the material of sidewall 124. For instance, base wall 122 may include a material having a higher thermal conductivity than sidewall 124.

A container lid 144 may be movably (e.g., rotatably) attached to cabinet 120 (e.g., at sidewall 124) to selectively move between an open position (not pictured) and a closed position (FIG. 1). In the open position, container lid 144 may be generally rotated or moved away from the opening 128 such that access to storage chamber 126 is permitted. By contrast, in the closed position, container lid 144 may cover the opening 128, and thereby restrict access to storage chamber 126. Thus, container lid 144 may selectively permit access to storage chamber 126. In optional embodiments, a container lock 132 is provided to selectively hold container lid 144 in the closed position. In other words, container lock 132 may hold the container lid 144 to the sidewall 124 and restrict access to the storage chamber 126. As is understood, container lock 132 may be provided as any suitable selectively locking mechanism (e.g., catch-latch assembly, receiving cavity-tumbler, etc.) and may be controlled by, for instance, a corresponding physical key or digital key (e.g., mated code or algorithm stored within a consumer's personal device, computer, smartphone, tablet, etc.).

In some embodiments, at least a portion of a conditioning assembly 134 is disposed within mechanical compartment 118. Optionally, one or more portions of conditioning assembly 134 may be disposed directly beneath receiving platform 116 (e.g., relative to or along the vertical direction V) to selectively cool, heat, or otherwise regulate the temperature within destination container 112 (e.g., at storage chamber 126).

As shown, certain embodiments of conditioning assembly 134 include a sealed cooling system for executing a vapor compression cycle for cooling air items or air within storage chamber 126. The sealed cooling system of conditioning assembly 134 may include a compressor 136, a condenser 138, an expansion device 140, and an evaporator 142 connected in fluid series and charged with a refrigerant. As will be understood by those skilled in the art, the sealed cooling system may include additional components (e.g., at least one additional evaporator, compressor, expansion device, or condenser). Moreover, evaporator 142 is provided in thermal communication with storage chamber 126 to cool the air or environment within storage chamber 126. Specifically, evaporator 142 may be mounted within mechanical compartment 118.

Within conditioning assembly 134, gaseous refrigerant flows into compressor 136, which operates to increase the pressure of the refrigerant. This compression of the refrigerant raises the refrigerant temperature, which is lowered by passing the gaseous refrigerant through condenser 138. Within condenser 138, heat exchange (e.g., with ambient air takes place) to cool the refrigerant and cause the refrigerant to condense to a liquid state.

In some embodiments, mechanical compartment 118 defines an air exhaust passage 146 to facilitate or accelerate heat exchange with the ambient air. As shown, air exhaust passage 146 may extend through mechanical compartment 118 to an ambient environment above ground 114. During use, air may thus be exchanged between mechanical compartment 118 and the ambient environment. Moreover, heat generated by compressor 136 or condenser 138 may be released to the ambient environment. For instance, a separate ambient air inlet 148 and ambient air outlet 150 may be defined by delivery base 110. Optionally, a compartment air handler or fan 152 may be mounted within mechanical compartment 118 to motivate an ambient air flow from the ambient air inlet 148 to the ambient air outlet 150 (e.g., across compressor 136 or condenser 138). In some such embodiments, compartment fan 152 is provided adjacent to compressor 136, in fluid isolation from the refrigerant. As the ambient air flow is motivated or directed through air exhaust passage 146 heat transfer may be accelerated, for example, between condenser 138 and the ambient environment.

Expansion device 140 (e.g., a mechanical valve, capillary tube, electronic expansion valve, or other restriction device) receives liquid refrigerant from condenser 138. From expansion device 140, the liquid refrigerant enters evaporator 142. Upon exiting expansion device 140 and entering evaporator 142, the liquid refrigerant drops in pressure and vaporizes. Due to the pressure drop and phase change of the refrigerant, evaporator 142 is cool relative to at least a portion of mechanical compartment 118 or storage chamber 126. Thus, evaporator 142 is a heat exchanger which transfers heat (e.g., from air or a feature contacting evaporator 142 to refrigerant flowing through evaporator 142).

Turning especially to FIG. 1, in exemplary embodiments, evaporator 142 is mounted to receiving platform 116. Specifically, evaporator 142 may be mounted within mechanical compartment 118 to an underside (e.g., bottom-facing surface 154) of receiving platform 116. Mechanical compartment 118 may be in fluid isolation from storage chamber 126 even when destination container 112 is in the delivered position. A top side (e.g., upper-facing surface 156) of receiving platform 116 may engage or contact base wall 122 (e.g., when destination container 112 is in the delivered position). Thus, evaporator 142 may be positioned opposite of base wall 122 when destination container 112 is in the delivered position. During use, evaporator 142 may be in conductive thermal engagement with both receiving platform 116 and base wall 122. Heat within storage chamber 126 may thus be dissipated via the conduction through base wall 122 and receiving platform 116.

Figure 3:
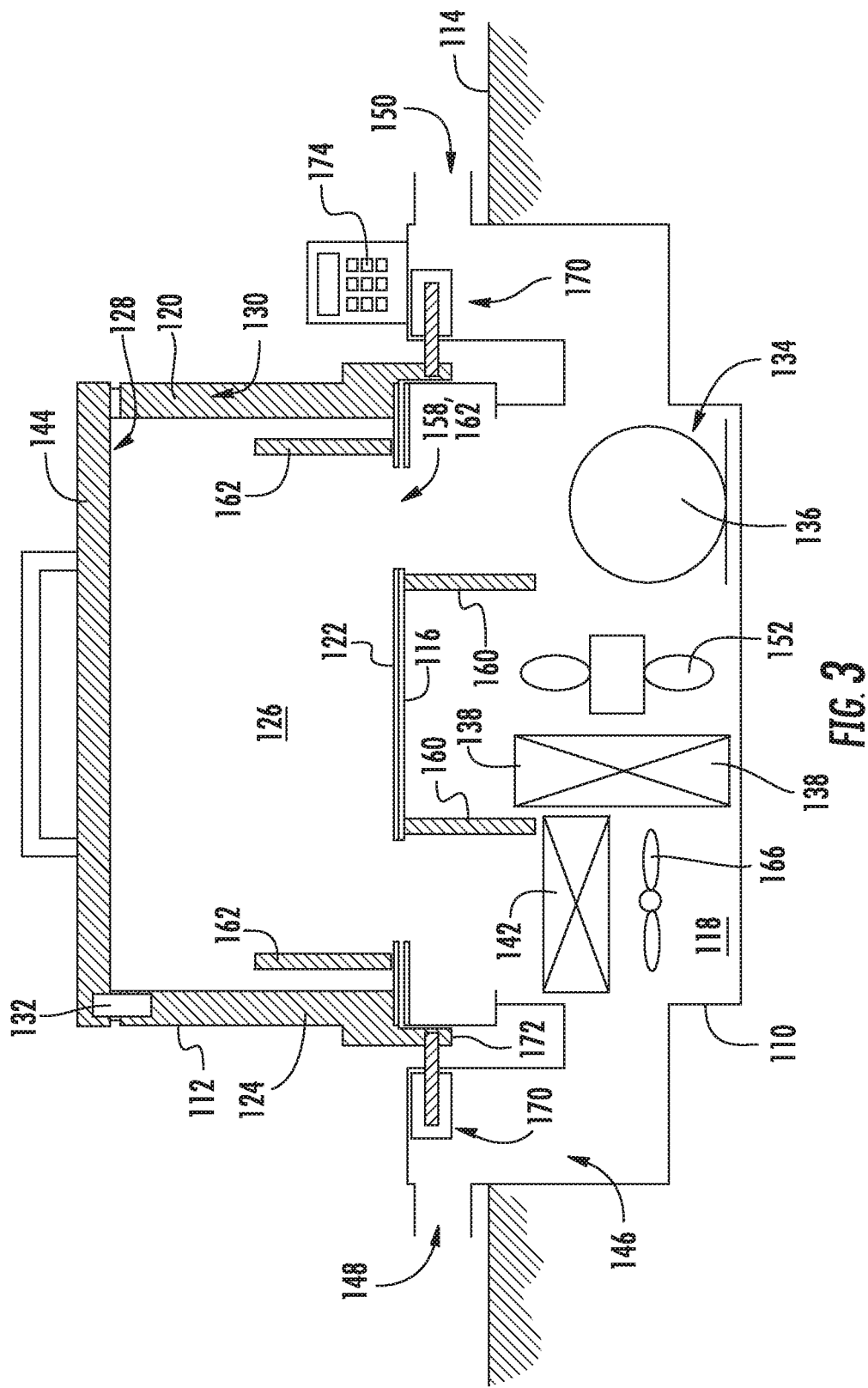
FIG. 3 provides a schematic, sectional view of a delivery retrieval station according to exemplary embodiments of the present disclosure, wherein a destination container is provided in a delivered position on a delivery base.
Figure 4:
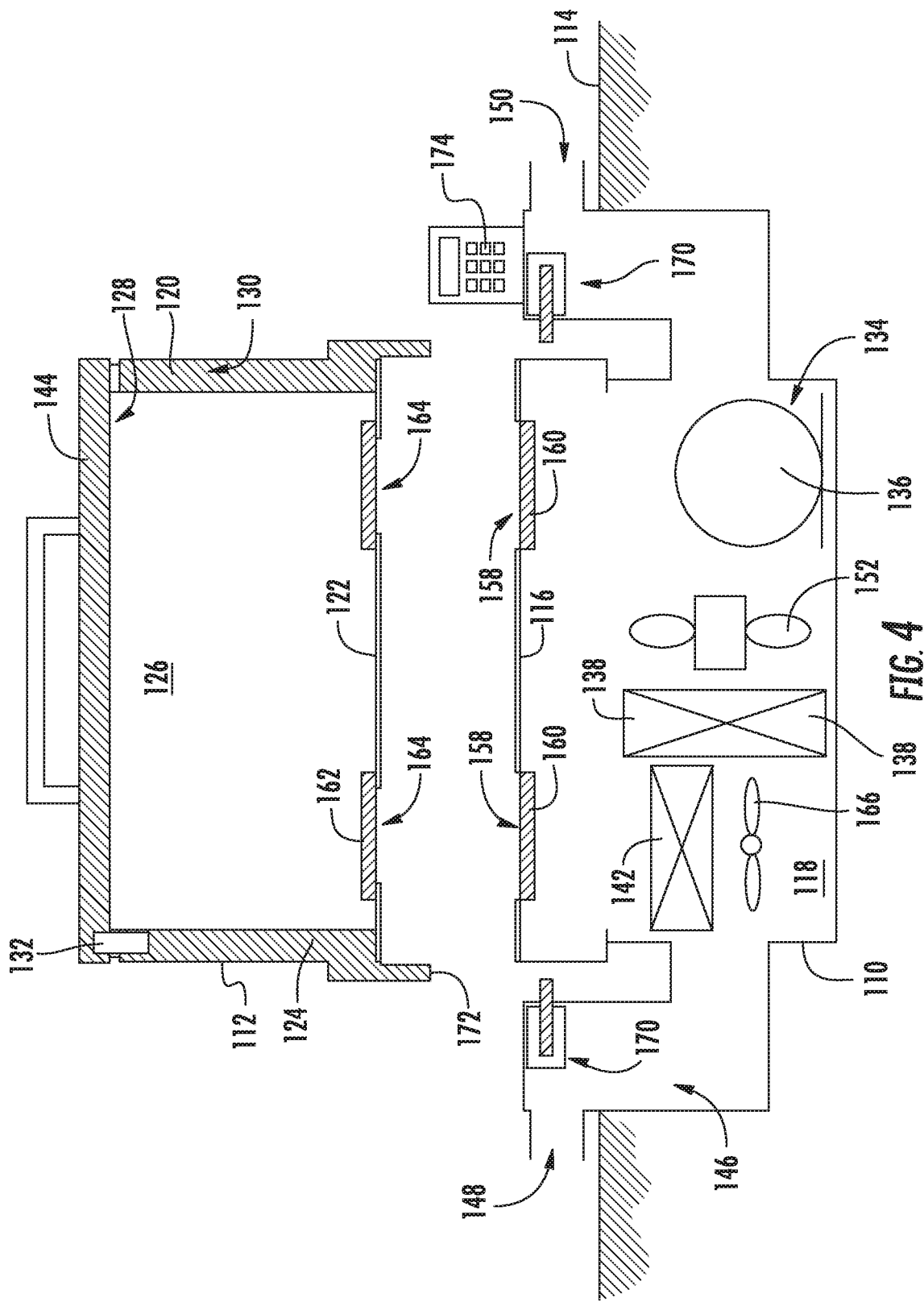
FIG. 4 provides a schematic, sectional view of the exemplary delivery retrieval station of FIG. 3, wherein the destination container is removed from the delivery base.

Turning especially to FIGS. 3 and 4, in alternative embodiments, evaporator 142 is spaced apart from receiving platform 116. For instance, evaporator 142 may be mounted below receiving platform 116 within mechanical compartment 118. Evaporator 142 may be configured to convectively exchange heat with storage chamber 126 (e.g., when destination container 112 is in the delivered position). In other words, evaporator 142 may be in selective convective thermal communication with storage chamber 126.

In some embodiments, receiving platform 116 defines one or more air exchange passages 158 that extend (e.g., vertically) from mechanical compartment 118. If multiple air exchange passages 158 are defined, each air exchange passage 158 may be spaced apart from the other(s) (e.g., along the lateral direction L or transverse direction).

In optional embodiments, an exchange door 160 corresponds to one or more of the air exchange passages 158 and is selectively movable (e.g., pivotable) between a closed position (FIG. 4) and an open position (FIG. 3). As shown, in the closed position air is generally restricted from flowing through air between mechanical compartment 118 and storage chamber 126, while in the open position, air movement may be permitted through the corresponding air exchange passage 158 between mechanical compartment 118 and storage chamber 126. Optionally, each air exchange passage 158 may have a corresponding exchange door 160 to open/close the air exchange passage 158.

In additional or alternative embodiments, one or more internal doors 162 are mounted within storage chamber 126, or otherwise on base wall 122. The internal door or doors 162 may selectively cover an aperture 164 defined through base wall 122. Along with corresponding to an aperture 164, each internal door 162 may correspond to an air exchange passage 158 defined by receiving platform 116. When destination container 112 is in the delivered position, the internal door 162 may thus be aligned with the corresponding air exchange passage 158. On or within destination container 112, each internal door 162 is selectively movable (e.g., pivotable) between a closed position (FIG. 4) and an open position (FIG. 3). As shown, in the closed position, air is generally restricted from flowing the corresponding aperture 164 or air exchange passage 158, while in the open position, air movement may be permitted through the corresponding air exchange passage 158 and aperture 164 between mechanical compartment 118 and storage chamber 126. Optionally, each air exchange passage 158 may have a corresponding internal door 162 to open/close the air exchange passage 158.

Generally, it is understood that the exchange doors 160 or internal doors 162 may be actuated or pivoted by any suitable structure, such as a spring-loaded end, electrically-controlled actuator, mechanical lever, etc.

Optionally, a coolant air handler or fan 166 may be mounted within mechanical compartment 118 to motivate a coolant air flow across the evaporator 142 to the storage chamber 126. In some such embodiments, coolant fan 166 is provided adjacent to evaporator 142, in fluid isolation from the refrigerant. As the coolant air flow is motivated or directed through air exchange passages 158, convective heat transfer may be accelerated, for example, between evaporator 142 and storage chamber 126.

Turning especially to FIG. 2, in additional or alternative embodiments, conditioning assembly 134 is generally configured to heat at least a portion of storage chamber 126. As an example, the sealed cooling system or compressor 136 may be configured to function as a heat pump (e.g., according to a reverse refrigeration cycle). As an additional or alternative example, conditioning assembly 134 may include one or more heating elements 168 mounted on or within mechanical compartment 118. For instance, a heating element 168 may be provided as any suitable heater (e.g., resistive heating element, gas heating element, radiant heating element, etc.) in thermal communication with receiving platform 116 to selectively heat a portion of conditioning assembly 134 or storage chamber 126. Heating element 168 may thus be activated to selectively generate heat within mechanical compartment 118 (e.g., when air within storage chamber 126 falls below a predetermined threshold).

Returning generally to FIGS. 1 through 4, in some embodiments, a station lock 170 is provided in mechanical communication between the base station and the destination container 112. For example, station lock 170 may be fixed to delivery base 110 to clasp or engage a portion of destination container 112 in the delivered position. As shown, station lock 170 may include a mating latch-catch engaging a peripheral lip 172 of sidewall 124 may selectively hold destination container 112 to delivery base 110. Nonetheless, as would be understood, alternative embodiments may include another suitable locking structure configured to mechanically and selectively secure destination container 112 to delivery base 110.

In some embodiments, a user interface panel 174 is provided for controlling one or more settings or features of destination container 112. For example, user interface panel 174 may include a plurality of user inputs, such as a touchscreen or button interface, for selecting a desired setting, action, or mode of operation. Operation of destination container 112 can be regulated by a controller 176 that is operatively coupled to or in wireless communication with user interface panel 174 or various other components, as will be described below. In optional embodiments, user interface panel 174 provides selections for user manipulation of the operation of conditioning assembly 134 such as, for example, selections regarding chamber temperature, locking destination container 112, or other various options. In additional or alternative embodiments, user interface panel 174 includes a display component, such as a digital or analog display in communication with controller 176 and configured to provide operational feedback to a user (e.g., consumer). In certain embodiments, user interface panel 174 represents a general purpose I/O ("GPIO") device or functional block.

In response to user manipulation of user interface panel 174 or one or more sensor signals (e.g., temperature signals received from a temperature sensor 178 mounted in thermal communication with storage chamber 126), controller 176 may operate various components of conditioning assembly 134 or destination container 112 in general.

As shown, controller 176 is communicatively coupled (i.e., in operable communication) with user interface panel 174. Controller 176 may also be communicatively coupled with various operational components of destination container 112 as well, such as container lock 132, sensors (e.g., temperature sensor 178), etc. Input/output ("I/O") signals may be routed between controller 176 and the various operational components of destination container 112. Thus, controller 176 can selectively activate and operate these various components. Various components of destination container 112 are communicatively coupled with controller 176 via one or more communication lines such as, for example, conductive signal lines, shared communication busses, or wireless communications bands.

In some embodiments, controller 176 includes one or more memory devices and one or more processors. Processors can be any suitable processing device (e.g., a processor core, a microprocessor, an ASIC, a FPGA, a microcontroller, etc.) and can be one processor or a plurality of processors that are operatively connected. When assembled, processors can generally execute programming instructions or control code associated with operation of delivery retrieval station 100. Memory devices can include one or more non-transitory computer-readable storage mediums, such as RAM, ROM, EEPROM, EPROM, flash memory device, magnetic disks, etc., and combinations thereof. Memory devices can store data and processor instructions that are executed by processors to cause delivery retrieval station 100 to perform operations. For example, processor instructions could be directives or processor actions for activating or controlling conditioning assembly 134, container lock 132, station lock 170 or user interface panel 174. Memory devices may also include data, such as approved identification data, received instruction data, etc., that can be retrieved, manipulated, created, or stored by processors.

Generally, controller 176 can be positioned in any suitable location throughout cabinet 120. For example, controller 176 may be located proximate to user interface panel 174 toward a front portion of destination container 112.

In certain embodiments, controller 176 includes a network interface 177 such that controller 176 can connect to and communicate over one or more networks with one or more network nodes. Controller 176 can also include one or more transmitting, receiving, or transceiving components for transmitting/receiving communications with other devices communicatively coupled with delivery retrieval station 100. Additionally or alternatively, one or more transmitting, receiving, or transceiving components can be located off board controller 176.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A delivery retrieval station comprising:
  a delivery base comprising a receiving platform and a conditioning assembly in thermal communication with the receiving platform, the conditioning assembly being disposed within a mechanical compartment beneath the receiving platform;
  a destination container selectively mounted to the delivery base, the destination container comprising a base wall and sidewall defining a storage chamber above the mechanical compartment, the base wall being selectively supported on the receiving platform in a delivered position; and
  a station lock in mechanical communication between the delivery base and the destination container, the container lock selectively joining the delivery base to the destination container in the delivered position,
  wherein the mechanical compartment defines an air exhaust passage extending through the mechanical compartment to an ambient environment in fluid isolation with the storage chamber to release heat to the ambient environment.
2. The delivery retrieval station of claim 1, wherein the destination container further comprises a container lid and a container lock, the container lid movably mounted to the sidewall to selectively permit access to the storage chamber, the container lock selectively holding the container lid to the sidewall and restricting access to the storage chamber.
3. The delivery retrieval station of claim 1, wherein the sidewall encloses an insulation.

4. The delivery retrieval station of claim 3, wherein the insulation comprises a phase change material.

5. The delivery retrieval station of claim 4, wherein the base wall comprises a conductive plate.

6. The delivery retrieval station of claim 1, wherein the conditioning assembly comprises a sealed cooling circuit.

7. The delivery retrieval station of claim 6, wherein the sealed cooling circuit comprises an evaporator mounted to an underside of the receiving platform.

8. The delivery retrieval station of claim 1, wherein the receiving platform defines an air exchange passage extending from the mechanical compartment, wherein the delivery base further comprises an exchange door selectively movable between a closed position restricting air through the air exchange passage and an open position permitting air movement through the air exchange passage between the mechanical compartment and the storage chamber.

9. The delivery retrieval station of claim 8, wherein the air exchange passage is a first air exchange passage, and wherein the receiving platform further defines a second air exchange passage spaced apart from the first air exchange passage.

10. The delivery retrieval station of claim 9, wherein the destination container further comprises an internal door aligned with the air exchange passage in the delivered position, wherein the internal door is selectively movable between a closed position restricting air through the air exchange passage and an open position permitting air movement through the air exchange passage between the mechanical compartment and the storage chamber.

11. A delivery retrieval station comprising:
a delivery base comprising a receiving platform and a conditioning assembly in thermal communication with the receiving platform, the conditioning assembly being disposed within a mechanical compartment beneath the receiving platform; and
a destination container selectively mounted to the delivery base, the destination container comprising a base wall and sidewall defining a storage chamber above the mechanical compartment, the base wall being selectively supported on the receiving platform in a delivered position,
wherein the receiving platform defines an air exchange passage extending from the mechanical compartment, wherein the delivery base further comprises an exchange door selectively movable between a closed position restricting air through the air exchange passage and an open position permitting air movement through the air exchange passage between the mechanical compartment and the storage chamber,
wherein the mechanical compartment defines an air exhaust passage extending through the mechanical compartment to an ambient environment in fluid isolation with the storage chamber to release heat to the ambient environment.

12. The delivery retrieval station of claim 11, wherein the destination container further comprises a container lid and a container lock, the container lid movably mounted to the sidewall to selectively permit access to the storage chamber, the container lock selectively holding the container lid to the sidewall and restricting access to the storage chamber.

13. The delivery retrieval station of claim 11, wherein the sidewall encloses an insulation.

14. The delivery retrieval station of claim 13, wherein the insulation comprises a phase change material.

15. The delivery retrieval station of claim 13, wherein the base wall comprises a conductive plate.

16. The delivery retrieval station of claim 11, wherein the conditioning assembly comprises a sealed cooling circuit.

17. The delivery retrieval station of claim 11, wherein the air exchange passage is a first air exchange passage, and wherein the receiving platform further defines a second air exchange passage spaced apart from the first air exchange passage.

18. The delivery retrieval station of claim 11, wherein the destination container further comprises an internal door aligned with the air exchange passage in the delivered position, wherein the internal door is selectively movable between a closed position restricting air through the air exchange passage and an open position permitting air movement through the air exchange passage between the mechanical compartment and the storage chamber.

* * * * *